US012621052B2

(12) United States Patent
Jayachandran et al.

(10) Patent No.: US 12,621,052 B2
(45) Date of Patent: May 5, 2026

(54) NETWORK DEVICE DEPLOYMENT RECORDER

(71) Applicant: Cisco Technology, Inc., San Jose, CA (US)

(72) Inventors: Malu Jayachandran, Andoor Po (IN); Shriti Gupta, Kolkata (IN); Li Sun, Austin, TX (US); Vaishnavi V, Bangalore (IN); Marco Mazzini, Seville (ES); Alberto Cervasio, Cuorgne' (IT)

(73) Assignee: Cisco Technology, Inc., San Jose, CA (US)

( * ) Notice: Subject to any disclaimer, the term of this patent is extended or adjusted under 35 U.S.C. 154(b) by 173 days.

(21) Appl. No.: 17/937,669

(22) Filed: Oct. 3, 2022

(65) Prior Publication Data

US 2024/0113776 A1 Apr. 4, 2024

(51) Int. Cl.
  H04B 10/079 (2013.01)
  H04L 41/08 (2022.01)

(52) U.S. Cl.
  CPC ......... H04B 10/0795 (2013.01); H04L 41/08 (2013.01)

(58) Field of Classification Search
  None
  See application file for complete search history.

(56) References Cited

U.S. PATENT DOCUMENTS

| | | | | | |
|---|---|---|---|---|---|
| 7,551,852 | B2 * | 6/2009 | Reintjes | ............. | H04B 10/2589 |
| | | | | | 398/31 |
| 8,886,033 | B2 * | 11/2014 | Azadeh | ................. | H04B 10/40 |
| | | | | | 398/25 |

| | | | | | |
|---|---|---|---|---|---|
| 8,995,829 | B2 * | 3/2015 | Barbieri | ........... | H04B 10/07955 |
| | | | | | 398/25 |
| 10,425,156 | B1 | 9/2019 | Zeng et al. | | |
| 10,938,484 | B2 * | 3/2021 | Jiang | .................. | H04B 10/6163 |
| 10,966,005 | B2 * | 3/2021 | Sadasivarao | ....... | H04Q 11/0067 |
| 11,265,081 | B2 * | 3/2022 | Yu | .......................... | H04B 10/25 |
| 11,632,170 | B2 * | 4/2023 | Kovsh | ................... | H04B 10/03 |
| | | | | | 398/1 |
| 2003/0165340 | A1 * | 9/2003 | Jayaram | ................ | H04J 14/025 |
| | | | | | 398/33 |
| 2010/0014853 | A1 * | 1/2010 | Astigarraga | ........... | H04B 10/40 |
| | | | | | 398/9 |
| 2011/0182571 | A1 | 7/2011 | Nelson et al. | | |

(Continued)

FOREIGN PATENT DOCUMENTS

CN          102323505 A          1/2012

OTHER PUBLICATIONS

Lutkevich, Ben, hot plugging, Jan. 2022 (Year: 2022).*

(Continued)

*Primary Examiner* — Jai M Lee

(74) *Attorney, Agent, or Firm* — Patterson + Sheridan, LLP

(57) ABSTRACT

Hot pluggable or swappable devices that are easily removed and replaced by a network operator may be monitored for faults and utilized in post-deployment use. Device specific local monitoring and storing of operational parameters during a deployment of a device in a network is described. Additionally, utilizing the recorded operational parameters of device to generate baseline conditions for the device and individualized recommendations for the device is also described.

16 Claims, 6 Drawing Sheets

(56)                 References Cited

U.S. PATENT DOCUMENTS

| | | | |
|---|---|---|---|
| 2013/0202289 A1* | 8/2013 | Tang | H04B 10/07 |
| | | | 398/17 |
| 2015/0350417 A1* | 12/2015 | Rhee | H04M 3/2209 |
| | | | 379/1.03 |
| 2017/0054507 A1 | 2/2017 | Elahmadi et al. | |
| 2020/0134421 A1* | 4/2020 | Suthar | G06N 3/045 |
| 2022/0291359 A1* | 9/2022 | Tziony | G01S 17/10 |
| 2023/0396510 A1* | 12/2023 | Prabhu | H04B 10/40 |

OTHER PUBLICATIONS

F. Musumeci et al., "A Tutorial on Machine Learning for Failure Management in Optical Networks," Lightwave Technology, Year: 2019, pp. 1-15.

G. Scott Glaesemann, "Advancements in Mechanical Strength and Reliability of Optical Fibers," Published in the Proceedings of the SPIE Critical Reviews vol. CR73 Reliability of Optical Fibers and Optical Fiber System, Dated: Sep. 20-21, 1999, pp. 1-23.

Francis Berghmans et al., "An Introduction to Reliability of Optical Components and Fiber Optic Sensors," NATO Security through Science Series B: Physics and Biophysics, ResearchGate, Dated: Dec. 2007, pp. 1-29.

Abhijit Chakravarty et al., "Characterizing Large-Scale Production Reliability for 100G Optical Interconnect in Facebook Data Centers," Facebook, Year: 2017, pp. 1.

* cited by examiner

NETWORK DEVICE DEPLOYMENT RECORDER

TECHNICAL FIELD

Embodiments presented in this disclosure generally relate to monitoring and assessing device performance in a network. More specifically, embodiments disclosed herein are related to monitoring a performance of a device over a deployment of the device in a network and using the monitored performance to generate baseline performance expectations for the device.

BACKGROUND

Optical and electronic devices deployed in a network are often hot pluggable or swappable devices that are easily removed and replaced by a network operator. While these devices are monitored at a network level, existing failure predictors utilize measurements related to real-time network effects and implementation of the network devices. In these examples, monitoring is focused on preventing any failures and outages of in the overall optical network and not directed to individual device performance.

Moreover, once a deployment of a device is ended and the device is dismantled or removed from the network, access to monitoring data is often either no longer available or is not available in a format that aids deployment-agnostic analysis of the device performance. This absence of device specific monitoring data prevents a fabricator or network operator from properly assessing device performance and may also lead to devices being decommissioned before a service life of the device is met. Device specific monitoring and assessment for devices in a network deployment remains a challenge.

BRIEF DESCRIPTION OF THE DRAWINGS

So that the way the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
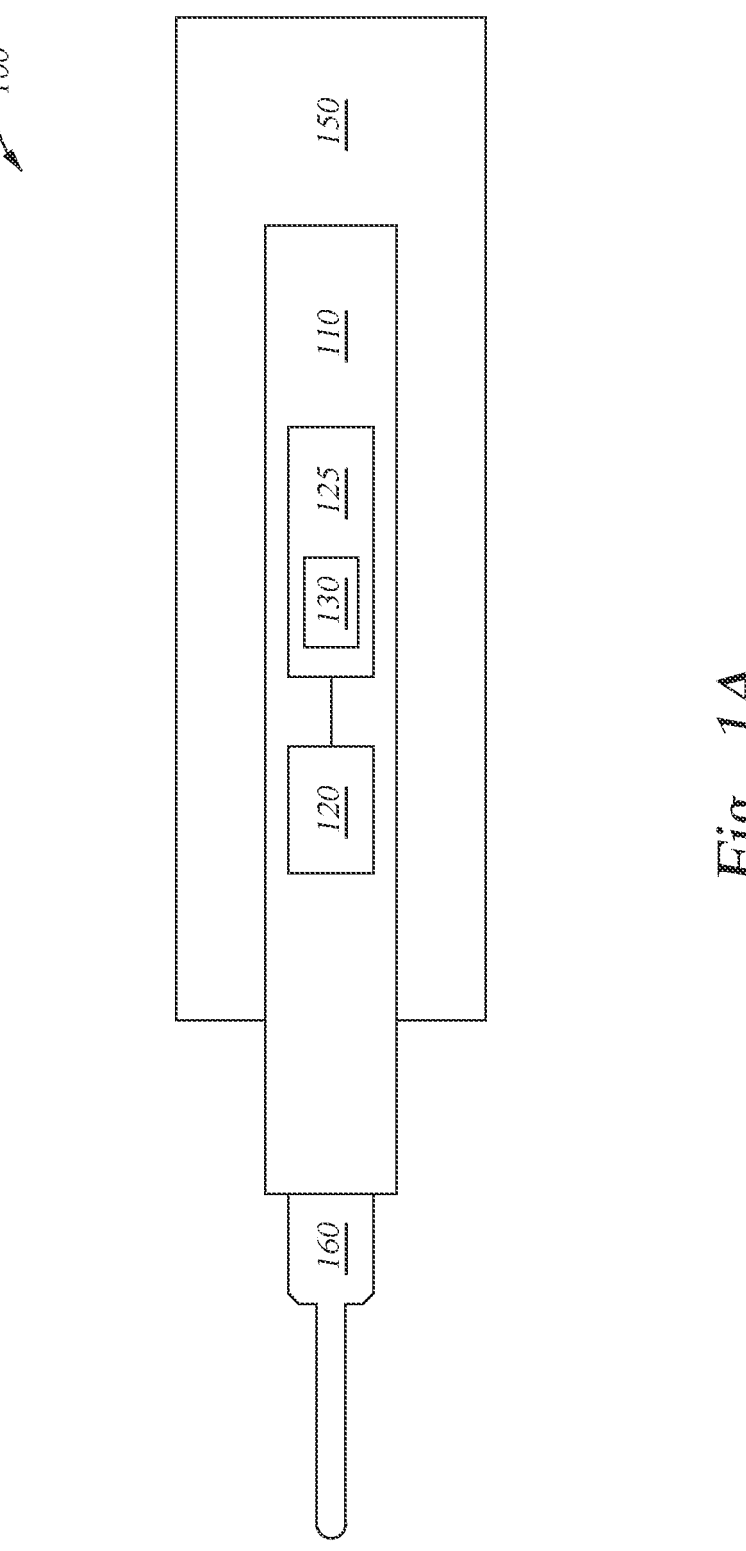
FIG. 1A illustrates an optical communication system with a deployed device, according to one embodiment.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One example system includes a device with a processor. The device also includes a memory containing a program which when executed by the processor performs an operation. The operation may include: during a deployment of the device in a network, recording, based on a recording interval, a plurality of interval parameters experienced by the device during the deployment; upon detecting a threshold event in the device, recording event parameters experienced by the device during the threshold event; and after a deployment of the device has ceased, exporting the recorded plurality of interval parameters and the recorded event parameters to a deployment analysis engine. Other embodiments of this aspect include corresponding computer systems, apparatus, and computer programs recorded on one or more computer storage devices, each configured to perform the actions of the methods.

One example embodiment is a method. The method includes during a deployment of a device in a network, recording, based on a recording interval, a plurality of interval parameters experienced by the device during the deployment; upon detecting a threshold event in the device, recording event parameters experienced by the device during the threshold event; and after a deployment of the device has ceased, exporting the recorded plurality of interval parameters and the recorded event parameters to a deployment analysis engine. Other embodiments of this aspect include corresponding computer systems, apparatus, and computer programs recorded on one or more computer storage devices, each configured to perform the actions of the methods.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions of a method. The method includes receiving interval parameters, event parameters, and device conditions from a plurality of devices; determining, from the interval parameters, the event parameters, and the device conditions, baseline conditions for the plurality of devices; extracting parameters from a first device of the plurality of devices for assessment, where the parameters may include parameters stored on the first device during a device deployment; determining a current condition for the first device based on the baseline conditions and the extracted parameters from the first device; and generating, based on the current condition and future use parameters, a device recommendation for the first device. Other embodiments of this aspect include corresponding computer systems, apparatus, and computer programs recorded on one or more computer storage devices, each configured to perform the actions of the methods.

EXAMPLE EMBODIMENTS

Network operators, including enterprise operators, data center operators, etc., utilize a combination of optical and electrical components in the network systems. Network operators, as referred to herein, include those entities that provide network hardware, infrastructure and technical support to a network system. Network customers include those who utilize the deployed communication networks executing on the network system. The combination of components that form the network systems includes components that are replaced infrequently (e.g., only after a long period of time or upon failure of the device) and components that are replaced frequently (e.g., routinely replaced as a matter of practice or upon failure of the device). While device failure may not be a common occurrence, when a network operator operates a network at scale, the monitoring and maintenance of the various components, including the upgrading/replacement of components, can be challenging.

For example, in optical networks, transceivers and other devices are often hot-pluggable or swappable devices that are designed for easy installation and replacement. These devices deployed in communication networks often have expected or designed service lives which exceed actual deployment in a network system. For example, operators of large scale networks (e.g., web scale, etc.) frequently upgrade associated network infrastructure due to increases in traffic growth and associated network hardware development. These upgrades often occur after only a fraction of a deployed device's service life has passed (e.g., hardware upgrade 3 years into a 10 year service life). The wholesale disposal of the removed devices prior to the associated end of service lives results in increased costs and material waste for a network operator.

In other cases, a device such as a transceiver may begin failing or malfunctioning well before an expected service life would indicate that the service life is ending. However, current methods for detecting the device failure do not provide insight into a cause of the failure. For example, a transceiver may fail or malfunction in a deployment due to certain operational conditions, but the network operator is not able to detect and relate these operational conditions to the device failure. For example, overload conditions, such as overloaded operating conditions and/or temperature variations, may shorten a service life of a device. However, when the fault device is removed from service, the corresponding causes may not be reflected in data available to a network operator.

For example, network operators often rely on alarms or alerts exported from the network devices, where the alarms/alerts are triggered when some thresholds of operating conditions are crossed. These alarms are often volatile, where the alarms are generated and exported as alerts, but no tracking or recording of the alarms is done at the device level. Furthermore, these solutions may depend upon live data collected using data collection methods along with cloud-based data storage on the cloud and real-time analytics performed by a network customer.

Since these solutions are often implemented by and under the control of network customers, relevant data and analytics are owned by the network customer and may not be readily available after a device is removed from the network. This lack of device focused monitoring can lead to devices in a network failing as well as devices being replaced and decommissioned before a service life of the device has been met.

The systems and methods described herein provide for device specific local monitoring and storing of operational parameters during a deployment of a device in a network as well as utilizing the recorded operational parameters of device to generate baseline conditions for the device and individualized recommendations for the device.

FIG. 1A illustrates an optical communication system with a deployed device, according to one embodiment. System 100 includes a network device 150 and an optical fiber 160, where the network device 150 and the optical fiber 160 form a part of an optical based network on the system 100. The network device 150 may include any type of electronic device used in an optical communication network. For example, the network device 150 may be implemented as a server, a switch, computer, storage device, etc. in the system 100. Additionally, while shown as an optical fiber in FIG. 1A, the optical fiber 160 may include any type of communication means (e.g., copper wire, etc.) which propagates communication signals through the system 100. The network device 150 is in communication with an optical fiber 160 via a device 110.

In some examples, the device 110 is optical and/or electronic device such as a transceiver that enables communication between the optical fiber 160 and the network device 150. For example, the device 110 may be a Small form-factor pluggable (SFP) transceiver or other type of hot-pluggable device, which is able to be removed and replaced by a network operator. For example, the network operator of the system 100 may upgrade the device 110 to enable faster speeds and better performance of the system 100.

In an example where the device 110 is deployed in the system 100 and the optical network associated with the system 100, the device 110 experiences various levels of measurable operational parameters. For example, typical Digital Optical Monitoring (DOM) parameters such as transceiver transmit bias current, transceiver transmit power, transceiver receive power, and transceiver power supply voltage are monitored on the device 110 by a controller 120. In some examples, power supply voltages are measured at DC-DC converters or a microcontroller input. Additionally, optical power input strength may be measured by a photodiode, which is calibrated in manufacturing. In some examples, optical output power is monitored by a monitor photodiode tapping the output light and calibrated to report total power. A temperature reading may be reported in different ways such on-board thermistor, DSP/CDR sensor or microcontroller sensor. In some examples, only one temperature has to be reported. For example, a sensor closest to the hottest point is selected and offset is done to translate to transceiver case temperature.

Additionally, other parameters such as alarm conditions, power on/off conditions, or other parameters are also monitored by the controller 120. The operational parameters and other conditions experienced by the device 110 during a deployment may ultimately affect the performance of the device 110.

In some examples, the controller 120 monitors and exports the conditions in real-time to enable a network operator/customer to monitor and troubleshoot network connections at the device 110. However, these examples rely on data transmission from the device 110 and may not fully capture an operational history of the device over time.

In order to capture operational parameters for a duration of a deployment in the system 100, the controller 120 operates as a deployment or "flight" recorder application in the pluggable optical device, device 110. The controller 120 records or stores relevant data related to Optical DOM performance parameters for the device 110 throughout its life span on memory 125, where the memory 125 is an internal electrically erasable programmable read-only memory (EEPROM) memory. The local storage allows for a network operator or other entity to read the stored data (operation parameters) directly from the device and provide the data to an external analytical engine for device assessment as described in relation to FIGS. 3-4.

In another example, recorded operation parameters may be read during device deployment and initiate preventive maintenance or other modes of operation for the controller 120 and device 110. In the examples described herein, the device 110 and the controller 120 store operational parameters in the memory 125 associated with the controller 120. For example, the controller 120 may store operational parameters 130 in the memory 125 as shown in FIG. 1A and described in more detail in relation to FIG. 1B.

Figure 1B:
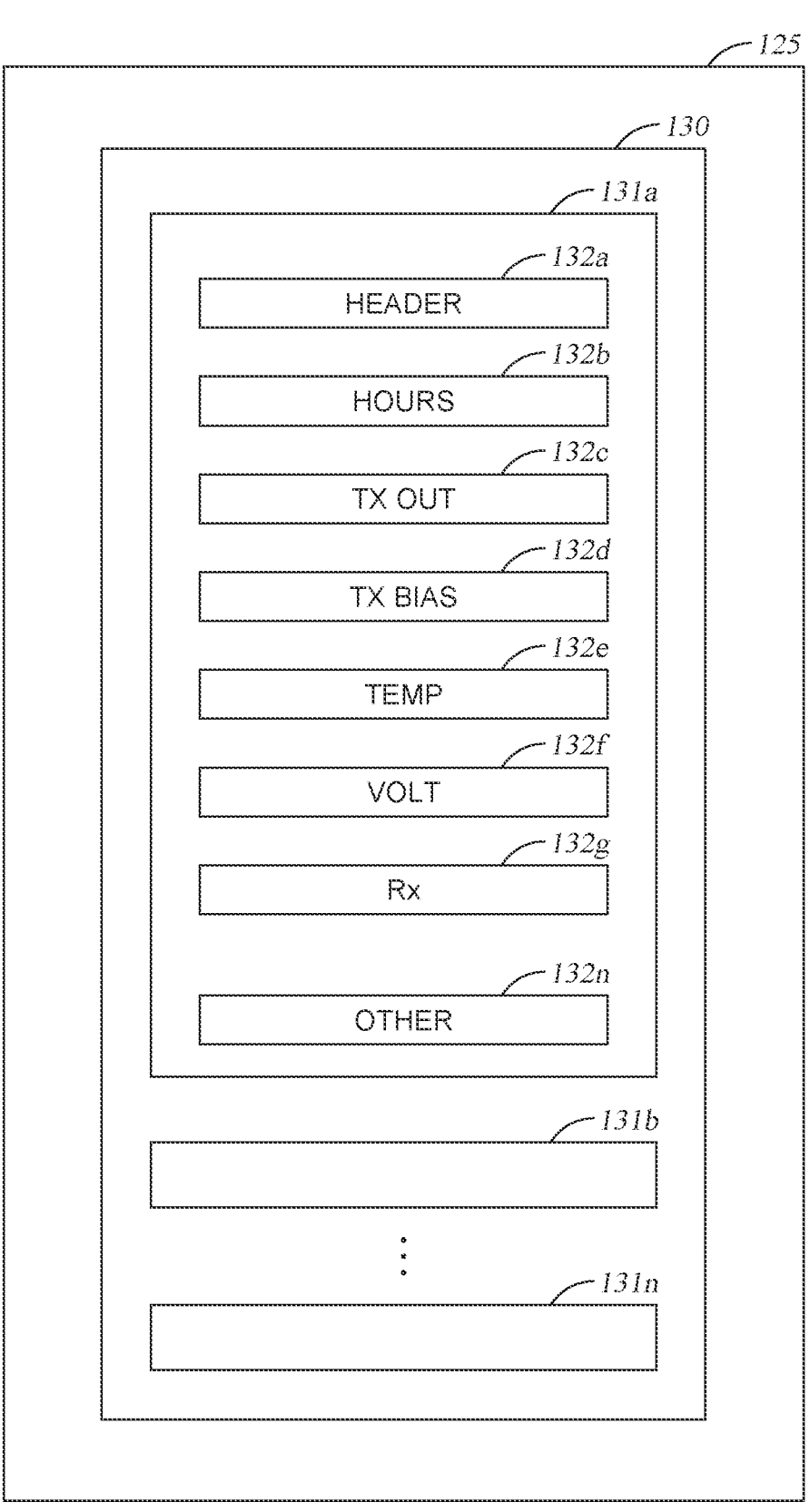
FIG. 1B illustrates a memory with recorded operational parameters, according to one embodiment.

FIG. 1B illustrates a memory with recorded operational parameters, according to one embodiment. In some examples, the memory 125 is an EEPROM which enables the controller 120 to store monitored operational parameters 130 on the device 110 as described in relation to method 200 of FIG. 2. The operational parameters 130 include parameter sets 131a-131n, where the parameter sets 131a-131n are recorded at a various times and for various purposes while the device 110 is deployed or installed in the system 100. In some examples, each of the parameter sets includes a collection of conditions 132a-132n at a given instance. For example, the parameter set 131a may be recorded as part of an interval recording, where the conditions 132a-132n are the conditions of the device measured or detected at the time when the parameter set 131a is recorded into the parameters 130. Recording the various operational parameters is described in more detail in relation to FIG. 2.

Figure 2:
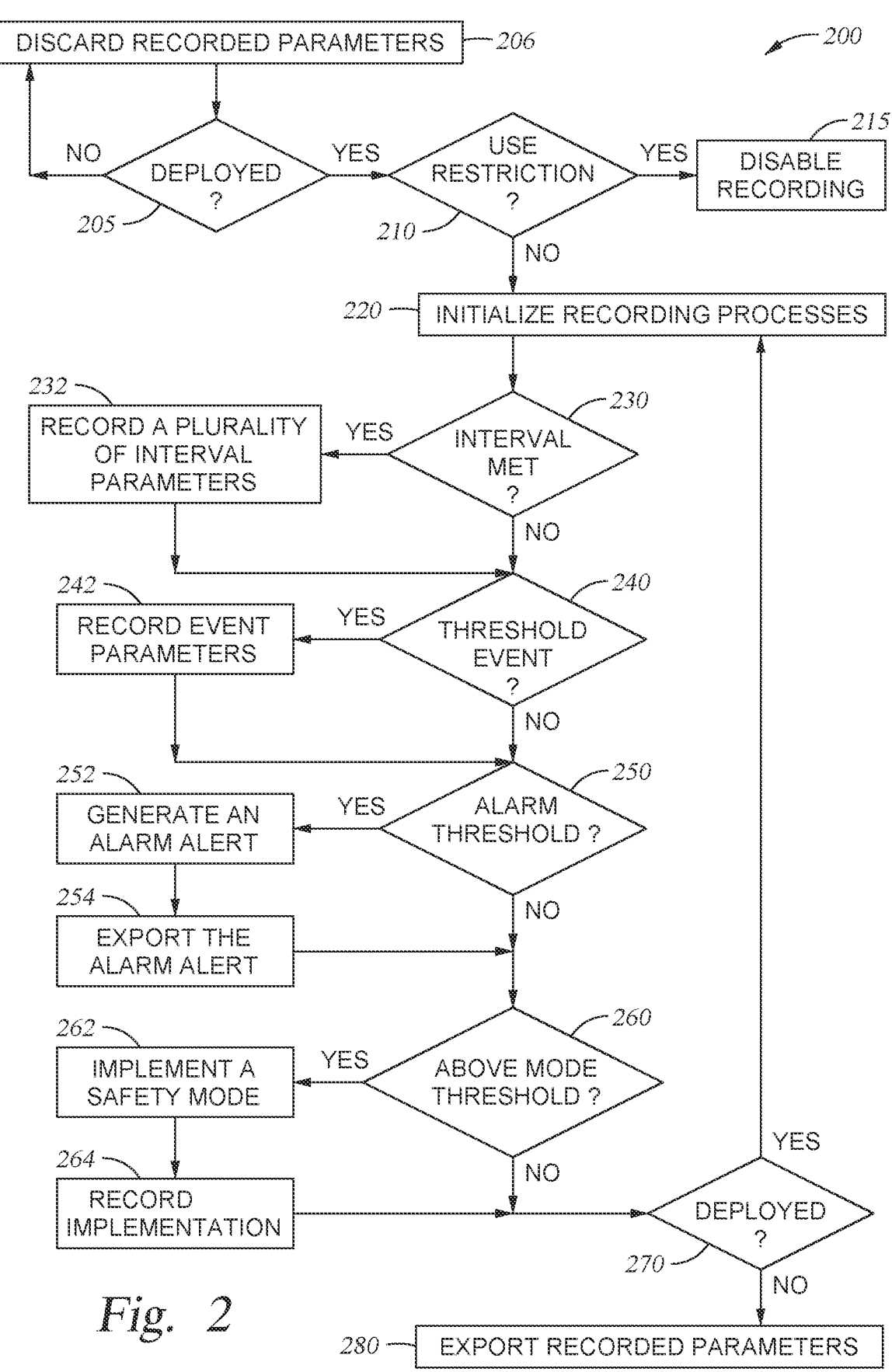
FIG. 2 is a method for recording operational parameters during a duration of a device deployment, according to one embodiment.

FIG. 2 is a method for recording operational parameters during a duration of a device deployment, according to one embodiment. Method 200 begins at block 205 where controller 120 determines whether the device 110 is in a test state or is deployed in a communication network. For example, during a manufacturing or fabrication process, the device 110 and the controller 120 may be activated, powered, or otherwise turned on several times for tuning parametric tests, verification, and other typical fabrication processes. In most cases, the operational parameters observed or measured during this time are not typical of a network deployment and/or not needed for assessment of the device after deployment.

In an example where the device is determined to not be deployed at block 205, method 200 proceeds to block 206 where measured operational parameters are discarded. For example, the controller 120, upon detecting that the device is in a test state, discards operational parameters including interval parameters and event parameters recorded during the test state of the device 110. The method then proceeds to back to block 205 to determine the deployment status at a later time.

In some examples, once testing and verification (or other pre-deployment processes) is complete, a fabricator or tester sets a flag indication on the controller 120, memory 125, or the device 110, where the flag indicates that the device 110 is ready for deployment. In another example, during a deployment initialization, the network operator may set a flag to indicate the device 110 is deployed in the system 100. The controller 120 may also determine the deployment status based on various other factors, such as operational parameters, a power status of the optical system or other system indicators. In an example, where the device 110 is determined to be deployed at block 205, method 200 proceeds to block 210. For example, the controller 120 detects that the device is in initialized in the deployment and begins recording processes described blocks 210-270.

At block 210, the controller 120 determines whether a use restriction is in place for the device 110. In some examples, use restrictions may be received or set at the controller 120 as a user selectable privacy conditions. For example, the controller 120 receives or is otherwise configured with a privacy condition selection from a network customer. For example, a network customer may indicate that certain privacy conditions should be met by the device 110 during operation in the system 100.

Example privacy conditions may include a use restriction which forbids the storage of the operational parameters during deployment in the system 100. In example, where the use restrictions prevent the recording of the operational parameters, method 200 proceeds to block 215, where the controller 120, disables recording of operational parameters at the device 110. In the example where the recording is disabled, the controller 120 may proceed through blocks 205 through 210 of method 200 to determine if the use restriction has changed during the deployment.

In another example, a privacy condition selection may include an encryption restriction, where the controller 120 encrypts any recorded operational parameters, including recorded interval parameters and recorded event parameters, as described herein.

At block 220, the controller 120 initializes recording processes for the device 110. In some examples, the controller 120 partitions or otherwise prepares a memory space in the memory 125 to store the parameters 130. For example, the controller may initialize or assign page space as parameters 130 for the storage of parameter sets 131a-131n. In some examples, a size of the parameters 130 or the size of the memory reserved for the parameter sets 131a-131n is configured or determined by a device fabricator, network operator, or network customer of the device 110.

In some examples, the size of the parameters 130 is determined based on an expected usage life of the device 110 and the size of the recorded conditions 132a-132n shown in FIG. 1B. For example, the recorded conditions may include an assigned or given information and an associated size. For example, condition 132a is a Header field with an associated size of 3 bytes. The conditions 132b is an accumulated hours field representing an operational time of deployment for the device 110 and has an associated size of 2 bytes. The conditions 132c and 132d are transmission (TX) Output Power and TX Bias Current, each with associated sizes of 2 bytes. The conditions 132e-132d also include associated sizes of 2 bytes each and related to a temperature of the device, a voltage of the device 110, and receiver Power (RX), respectively. The condition 132n may include other information related to the operation of the device 110 set by a network operator or other user.

In some examples, a total available memory of the memory 125 (or the parameters 130) may be greater than a memory needed as determined by the network operator. For example, a total recording size for parameters sets 131a-131n may include approximately 32000 bytes. In the example described above, the parameter set 131a (excluding the condition 132n) is approximately 20 bytes, which allows for a total of 2133 sets to be stored in the parameters 130 before filling the allocated total recording size. For a 10 year expected life of the device a weekly recording interval includes in approximately 7,800 bytes in recorded parameters, where a twice a week recording interval is 15,600 bytes. The network operator for the system 100 may set a predetermined time period for recording the interval parameters and the various recording settings (e.g., how often parameters are recorded or the predetermined) to maximize utilization of the available memory without causing the memory to be overfilled or overwritten. Additionally, respective portions of the memory 125 may be reserved for interval parameters and event parameters as described herein.

In some examples, the parameter sets 131a-131n are defined/recorded in custom EEPROM pages which are accessible to a network operator. For example, the network operator may access the parameter sets 131a-131n via a direct read or data dump from the system without removing the device 110, or by offline analysis, where the device 110 is plugged over a simple module compliance board (MCB) with I2C access. In any of the examples described above, the controller 120 is ready to begin recording the operational parameters for the device 110 at the block 220.

At block 230, the controller 120 determines whether a recording interval has been met. For example, when the recording interval is a given time, the controller determines from the parameters 130 and an associated device clock whether sufficient time has passed since a previous recording of interval parameters. In some examples, the interval parameters provide a consistent recording of the operational parameters of the device without accounting for events or other changes to the device 110. For example, when the recording interval is twice a week, the controller 120 records the interval parameters twice a week for the duration of the deployment of the device in the system 100.

When sufficient time has passed as determined at block 230, method 200 proceeds to block 232 where the controller 120 records a plurality of interval parameters experienced by the device 110 during the deployment at the given time. In some examples, the interval parameters include the parameters described in relation to FIG. 1B and include the parameters monitored using DOM and other parameters set by the network operator. In some examples, the interval parameters predetermined by the device fabricator and/or the network operator for the system 100 based on configuration preferences and the device type for the device 110. The recorded interval parameters are stored with an identification of the time of recording and the method 200 proceeds to block 240.

At block 240, the controller 120 determines whether a threshold event has occurred or is occurring at the device 110. For example, a threshold event may include any anomalous event detected or indicated to the controller 120. For example, an initialization of the device 110 into the network device 150 is a threshold event where the controller 120 detects the initialization and records events parameters during a given time of initialization at block 242. For example, the controller 120 may record event parameters for the device 110 for a set time after initialization.

In another example, the device 110 may enter a reset/low power state, a link flap or LOS status. In some examples, the device 110 experiencing an alarm condition, or other condition may also meet the event threshold parameters, such that the controller 120 records the event parameters at block 242.

Upon detecting a threshold event in the device 110 at block 240, the controller 120 records event parameters experienced by the devices during the threshold event at block 242. For example, the controller 120 records the number of times and timestamp for the device 110 entering the reset/low power state. The controller 120 may also record the number of times that module recovers from the link flap or LOS status. The controller 120 may also record a physical status of the device 110 when an alarm occurs (e.g., a current temperature when a LOS was reported), the maximum/minimum temperature for the device 110, the maximum/minimum Laser bias for the device 110, maximum/minimum for input voltages and inside voltage, etc. In some examples, the event parameters provide additional insight for the performance and wear of the device 110 when combined with the interval parameters recorded at block 232. In some examples, the event parameters include the parameters described in relation to FIG. 1B and include the parameters monitored using DOM. In some examples, the event parameters are predetermined by the device fabricator and/or the network operator for the system 100 based on configuration preferences. Additionally, the controller 120 may record the event parameters at block 242 for a given time or until the event threshold condition has cleared from the device 110.

At block 252, the controller 120 upon detecting an alarm threshold has been met (at block 250), generates an alarm alert for the device and exports the alarm alert for review at block 254. For example, upon detecting a number of alarms has occurred for the device 110 and the criticality of the alarms, the controller 120 flags or otherwise generates an alarm alert for immediate export. For example, when the device 110 is experiencing frequent operational conditions that cause alarms or errors, the controller 120 alerts the network operator of the conditions and indicates a potential for device 110 failure.

At block 260, the controller 120 determines, from the recorded plurality of interval parameters and the recorded event parameters, the device is operating above a mode threshold and implements a safety mode (at block 262) when the device is above the mode threshold. The controller 120 also records the implementation of the safety mode at block 264. In this example, the controller 120 enables the use of automatic mechanisms that compensate the ageing of some components and/or provide protections to the device 110 to ensure proper functions of the system 100.

For example, the controller 120 enables closed loop modes implemented by using a configuration change of the device 110. For example, the controller 120 tracks a drift or change of some operational parameters such as Tx power. When the device 110 reaches the safety mode threshold, the controller 120 implement the safety mode and request that the device 110 system to compensate for the drift or update the operation conditions to avoid further entrance into the safety mode.

In some examples, the safety modes thresholds are recorded and stored into the memory 125 during manufacturing tests. Additionally, Vertical-cavity surface-emitting laser (VCSEL) bias current may be changed by the controller 120 on the device 110 when in the safety mode, when given Ibias/Pwr characteristics of the device 110. These changes may be using be a per/lane formula which depends on voltages/T corners.

Another example safety mode may include a constant power/OMA operational modal analysis mode which may be configured by the network operator and/or may be enabled by the controller 120 when power levels thresholds are hit and maintained over a certain amount of time. In this example, the controller 120 reacts by increasing/reducing the VCSEL bias current, and records the initialization of this mode into the memory 125. In some examples, the safety mode described in blocks 260-264 extends the service-life of the device 110 and also reduces failures and overall power consumption of the device 110.

At block 270, the controller 120 determines whether the device 110 is still deployed and returns back to block 220 when the device 110 is deployed in the system 100. When the controller 120 is not deployed (e.g., removed from the device 110), method 200 proceeds to block 280 where the controller 120 exports the recorded parameters 130 to an assessment system as described in relation to FIGS. 3 and 4.

Figure 3:
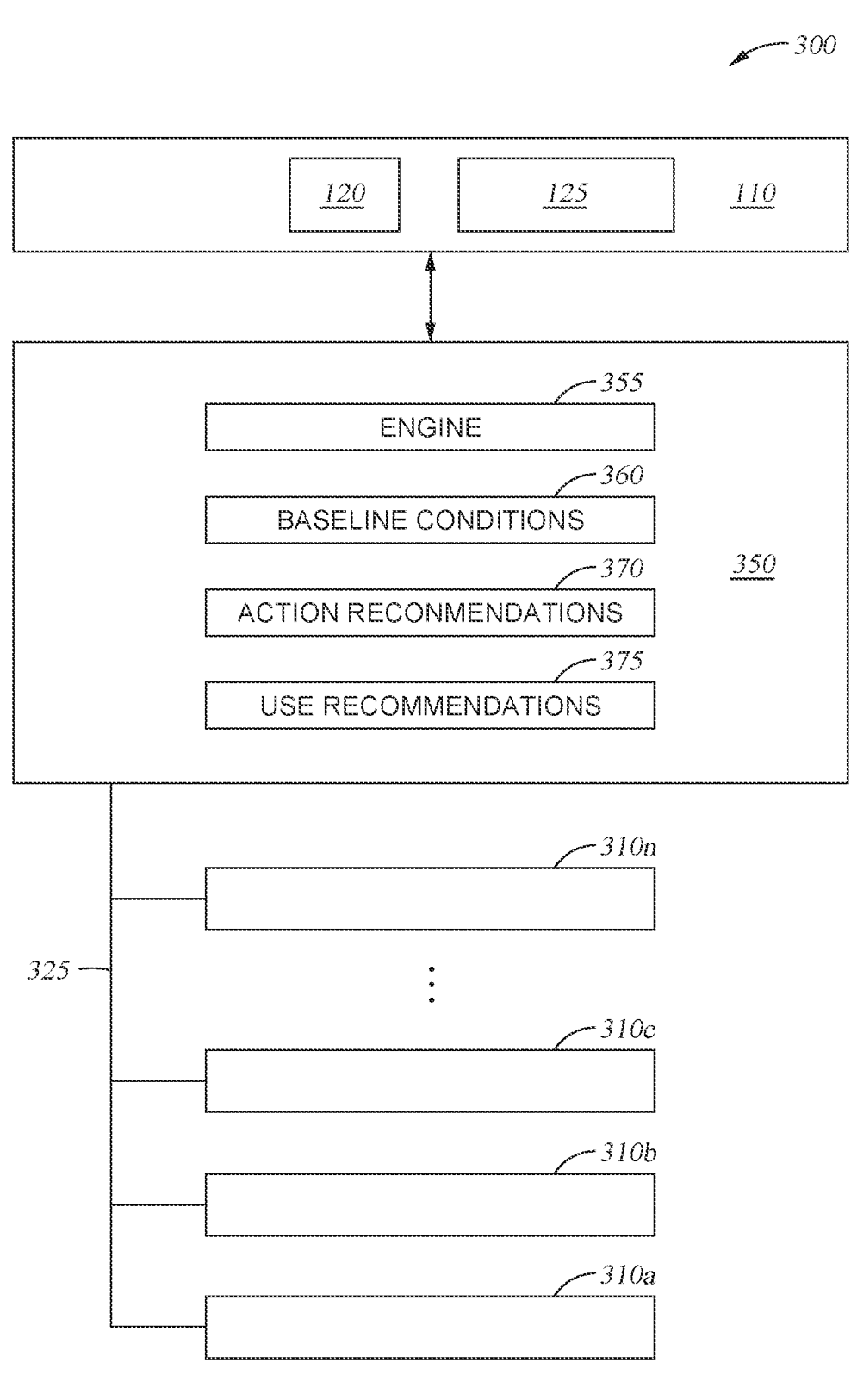
FIG. 3 illustrates device assessment system, according to one embodiment.

FIG. 3 illustrates a device assessment system, according to one embodiment. System 300 includes the device 110, devices 310a-310n, and assessment system 350. The assessment system 350 includes a deployment analysis or engine 355 as well as baseline conditions 360, action recommendations 370, and use recommendation 375. The components of the system 300 and the assessment system 350 interact to perform an assessment of a device as described in relation to FIG. 4.

Figure 4:
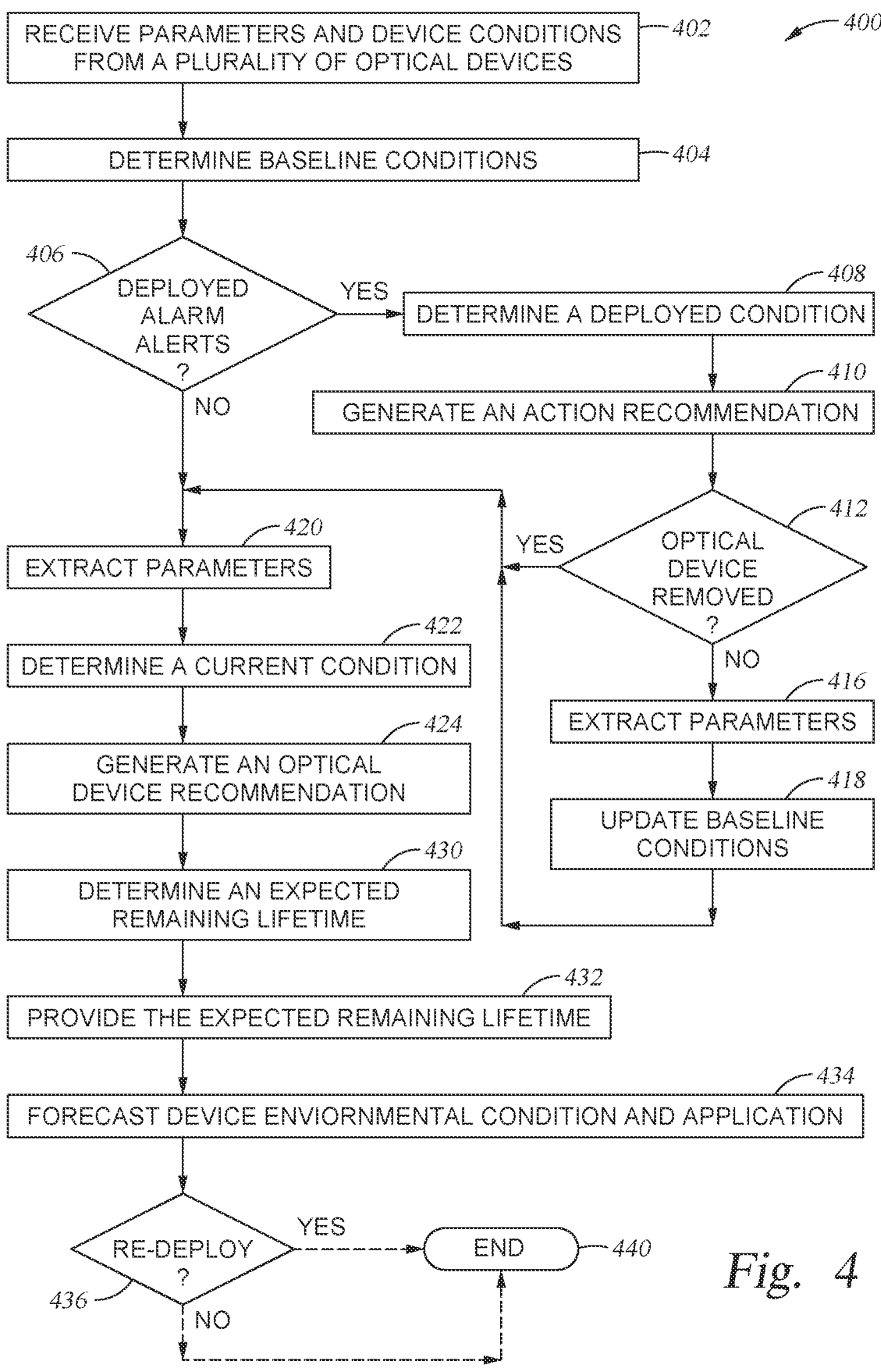
FIG. 4 is a method for device assessment, according to one embodiment.

FIG. 4 is a method for device assessment, according to one embodiment. For ease of discussion, reference will be made to system 300 as shown in FIG. 3 during discussion of FIG. 4. Method 400 begins at block 402 where the engine 355 receives interval parameters, event parameters, and device conditions from a plurality of devices and determines, from the interval parameters, the event parameters, and the device conditions, baseline conditions for the plurality of devices. For example, the engine 355 receives operational parameters from the devices 310a-310n. In some examples, the device 310a-310n are new devices in a fabrication process, previously deployed device, and/or failed devices. In some examples, the engine 355 receives the operation parameters and conditions for each respective device via connection 325. The engine 355 also uses operation parameters and the condition of the devices to generate baseline conditions for a device.

For example, the device 310a-310n (and the device 110) may include one type or model of a device, where the engine 355 generates baseline conditions 360 for the model of the device at block 404. In another example, the devices 310a-310n may include a class of similar devices (e.g., optical transceivers) such that the engine 355 generates the baseline conditions for the class of similar devices. The engine 355 may include machine learning and/or recursive learning algorithms (e.g., a neural network) configured to relate operational parameters of the devices with the received conditions of the devices and store the determined relations as the baseline conditions.

For example, the engine 355 may determine that the devices 310a-310n operating under expected or design conditions may operate at an extended service life based on the operational parameters received from the devices. In another example, the baseline conditions 360 may indicate that the devices 310a-310n operating in overload conditions for a given time reduces the service life or increases failure risk in the devices. In some examples, the engine 355 continually updates the baseline conditions for the devices as additional devices 310n are connected to the assessment system 350.

At block 406, the engine 355 determines when an alarm alert is received from a device. For example, the device 110 in deployment in the system 100 may generate an alarm alert based on a high threshold of alarms triggering at the device 110. In some examples, the system 100 provides the alarm alert to the engine 355 and method 400 proceeds to block 408 where the engine 355 determines a deployed condition of the device. For example, the engine 355 verifies that the device 110 remains deployed in the system 100.

At block 410, the engine 355 generates, based on the deployed condition of the first device and deployed use parameters, an action recommendation. For example, the engine 355 uses current status information (e.g., recorded operation parameters, DOM data, etc.) for the device 110, the baseline conditions 360, and action recommendation 370 to generate an action recommendation for the network operator of the system 100. For example, when the current status information and the baseline conditions 360, and action recommendations 370 indicate that the device 110 is close to failure, the engine recommends a device removal from the system 100. In another example, the action recommendation may include alterations to the operating conditions at the device 110, where the alterations prevent damage to the device 110 during operation.

At block 412, the engine 355 determines whether the action recommendation includes removing the first device from the deployment and upon removal of the device 110 from the system 100, extracts deployed interval parameters and deployed event parameters from the first device at block 416. At block 418, the engine 355 updates the baseline conditions 360 based on the deployed interval parameters and deployed event parameters extracted from the removed device.

At block 420, the engine 355 extracts parameters from a first device of the plurality of devices for assessment, where the parameters comprise parameters stored on the first device during a device deployment and at block 422, the engine 355 determines a current condition for the device based on the baseline conditions and the extracted parameters from the device.

At block 424, the engine 355 generates, based on the current condition and future use parameters, a device recommendation for the first device.

At block 430, the engine 355 determines an expected remaining lifetime for the device and provides the expected remaining lifetime of the first device to a deployment operator at block 432.

At block 434 the engine 355 determines a forecast for the device, including environmental conditions and applications based on the expected remaining life. At block 436, the engine 355 determines when the device recommendation includes a recommendation to redeploy the device and includes the re-deployment decision in information provided to the network operator. In this example, the network operator is able to reuse the device 110 in a different deployment, which reduces costs associated with building/implementing a network as well as reduces an environmental impact of requiring new devices in a different network deployment. The method 400 then ends at block 440.

Figure 5:
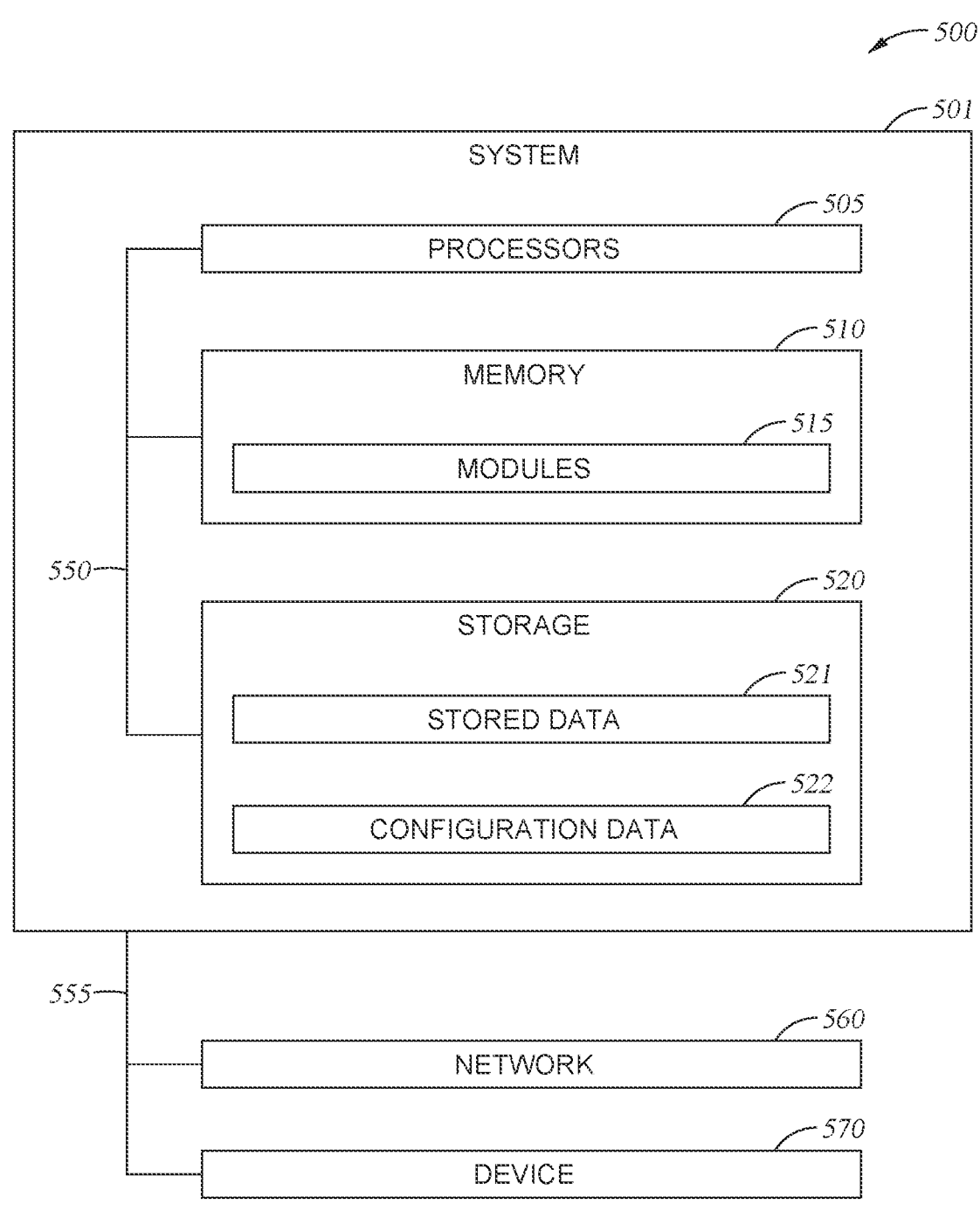
FIG. 5 illustrates a block diagram of a system, according to one embodiment.

FIG. 5 illustrates a device, according to one embodiment. The arrangement 500 and device 501 may include a device in the system 100 such as the device 110 shown in FIG. 1A, and perform the methods of the controller 120 described herein. In another example, the arrangement 500 and the device 501 may include assessment system 350 shown in FIG. 3 and perform the methods of the engine 355. The device 501 is shown in the form of a general-purpose computing device. The components of device 501 may include, but are not limited to, one or more processing units or processors 505, a system memory 510, a storage system 520, a bus 555 that couples various system components including the system memory 510 and storage system 520 to processors 505 along with an external network interface and the network 560 and devices 570 via input/output interface. In some embodiments, arrangement 500 is distributed and includes a plurality of discrete computing devices that are connected through wired or wireless networking.

System memory 510 may include a plurality of program modules, modules 515, for performing various functions related to recording operation parameters (when embodied as device 110) and performing device assessment (when embodied as assessment system 350), described herein. The modules 515 generally include program code that is executable by one or more of the processors 505. The modules 515 may include the controller 120 or the engine 355. In some examples, the modules 515 may be distributed and/or cloud based applications/modules. Additionally, storage system 520 may include media for storing stored data 521 and configuration data 522, and other information. The information stored in storage system 520 may be updated and accessed by the modules 515 described herein.

Additionally various computing components may be included to perform the methods described herein. For example, bus 550 represents one or more of any of several types of bus structures, including a memory bus or memory controller, a peripheral bus, an accelerated graphics port, and a processor or local bus using any of a variety of bus architectures. In some examples, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Further, device 501 typically includes a variety of computer system readable media. Such media may be any available media that is accessible by device 501, and it includes both volatile and non-volatile media, removable and non-removable media.

System memory 510 can include computer system readable media in the form of volatile memory, such as random access memory (RAM) and/or cache memory. Device 501 may further include other removable/non-removable, volatile/non-volatile computer system storage media. In some examples, storage system 520 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 550 by one or more data media interfaces.

As depicted and described above, system memory 510 may include at least one program product having a set (e.g., at least one) of modules 515 that are configured to carry out the functions of embodiments of the invention. Device 501 may further include other removable/non-removable volatile/non-volatile computer system storage media. In some examples, storage system 520 may be included as part of system memory 510 and may typically provide a non-volatile memory for the networked computing devices, and may include one or more different storage elements such as Flash memory, a hard disk drive, a solid state drive, an optical storage device, and/or a magnetic storage device.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium, such as a non-transitory computer readable medium, that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A hot-pluggable device comprising:
a processor; and
a memory containing a program which when executed by the processor performs an operation comprising:
during a deployment of the hot-pluggable device in a network, recording, based on a recording interval, a plurality of interval parameters experienced by the hot-pluggable device during the deployment;
upon detecting a threshold event in the hot-pluggable device, recording event parameters experienced by the hot-pluggable device during the threshold event;
determining, from the recorded plurality of interval parameters and the recorded event parameters, the hot-pluggable device is operating above a safety mode threshold;
implementing a safety mode when the hot-pluggable device is above the safety mode threshold;
recording the implementation of the safety mode; and
after the deployment of the hot-pluggable device has ceased, exporting the recorded plurality of interval parameters and the recorded event parameters to a deployment analysis engine.

2. The hot-pluggable device of claim 1, wherein the operation further comprises:

upon detecting that the hot-pluggable device is in a test state, discarding the plurality of interval parameters and event parameters recorded during the test state; and
upon detecting that the hot-pluggable device is in initialized in the deployment, beginning recording processes.

3. The hot-pluggable device of claim 1, wherein the operation further comprises:
upon detecting an alarm threshold has been met, generating an alarm alert for the hot-pluggable device; and
during the deployment, exporting the alarm alert for review.

4. The hot-pluggable device of claim 1, wherein the plurality of interval parameters comprises Digital Optical Monitoring (DOM) parameters.

5. The hot-pluggable device of claim 1, wherein the operation further comprises:
receiving a privacy condition selection from a user;
when the privacy condition selection comprises a use restriction, disabling recording of parameters at the hot-pluggable device; and
when the privacy condition selection comprises an encryption restriction, encrypting the recorded plurality of interval parameters and the recorded event parameters.

6. The hot-pluggable device of claim 1, wherein the recording interval comprises a predetermined time period for recording the interval parameters.

7. The hot-pluggable device of claim 1, wherein the hot-pluggable device further comprises an electrically erasable programmable read-only memory (EEPROM), wherein the operation further comprises:
recording the plurality of interval parameters and the recorded event parameters in the EEPROM.

8. The hot-pluggable device of claim 1, wherein the hot-pluggable device comprises a pluggable transceiver, wherein the processor and the memory are in the pluggable transceiver.

9. A hot-pluggable device comprising:
a processor; and
a memory containing a program which when executed by the processor performs an operation comprising:
initializing the hot-pluggable device in a test state;
recording, based on a recording interval, a first plurality of interval parameters experienced by the hot-pluggable device;
upon detecting a threshold event in the hot-pluggable device, recording a first plurality of event parameters experienced by the hot-pluggable device during the threshold event;
upon detecting that the hot-pluggable device is in the test state, discarding the first plurality of interval parameters and first plurality of event parameters recorded during the test state; and
upon detecting that the hot-pluggable device is deployed in a network, begin recording a second plurality of interval parameters and second plurality of event parameters; and
after the deployment of the hot-pluggable device has ceased, exporting the recorded second plurality of interval parameters and the recorded second plurality of event parameters to a deployment analysis engine.

10. The hot-pluggable device of claim 9, further comprising:
upon detecting an alarm threshold has been met, generating an alarm alert for the hot-pluggable device; and
during the deployment, exporting the alarm alert for review.

11. The hot-pluggable device of claim 9, further comprising:

determining, from the recorded plurality of interval parameters and the recorded event parameters, the hot-pluggable device is operating above a safety mode threshold;

implementing a safety mode when the hot-pluggable device is above the safety mode threshold; and recording the implementation of the safety mode.

12. The hot-pluggable device of claim 9, further comprising:

receiving a privacy condition selection from a user;

when the privacy condition selection comprises a use restriction, disabling recording of parameters at the hot-pluggable device; and when the privacy condition selection comprises an encryption restriction, encrypting the recorded plurality of interval parameters and the recorded event parameters.

13. The hot-pluggable device of claim 9, wherein the recording interval comprises a predetermined time period for recording the interval parameters.

14. The hot-pluggable device of claim 9, wherein the hot-pluggable device further comprises an electrically erasable programmable read-only memory (EEPROM), wherein the operation further comprises:

recording the plurality of interval parameters and the recorded event parameters in the EEPROM.

15. The hot-pluggable device of claim 9, wherein the hot-pluggable device comprises a pluggable transceiver.

16. A hot-pluggable device comprising:

a processor; and a memory containing a program which when executed by the processor performs an operation comprising:

receiving a first privacy condition selection from a user comprising a use restriction, disabling recording of parameters at the hot-pluggable device;

receiving a second privacy condition selection from the user, after the first privacy condition, comprising an encryption restriction, overwriting the first privacy condition;

during a deployment of the hot-pluggable device in a network, recording, based on a recording interval, a plurality of interval parameters experienced by the hot-pluggable device during the deployment, wherein the recorded plurality of interval parameters are encrypted;

upon detecting a threshold event in the hot-pluggable device, recording event parameters experienced by the hot-pluggable device during the threshold event, wherein the recorded event parameters are encrypted; and after the deployment of the hot-pluggable device has ceased, exporting the recorded plurality of interval parameters and the recorded event parameters to a deployment analysis engine.

* * * * *